(12) United States Patent
Rixen et al.

(10) Patent No.: US 6,227,708 B1
(45) Date of Patent: May 8, 2001

(54) GUIDING FRAME

(76) Inventors: Wolfgang Rixen; Gerrit Pies, both of Friedenstrasse 107-109, D-42699, Solingen (DE)

( * ) Notice: Subject to any disclaimer, the term of this patent is extended or adjusted under 35 U.S.C. 154(b) by 0 days.

(21) Appl. No.: 09/242,237

(22) PCT Filed: Jul. 30, 1997

(86) PCT No.: PCT/EP97/04145

§ 371 Date: Dec. 14, 1999

§ 102(e) Date: Dec. 14, 1999

(87) PCT Pub. No.: WO98/05469

PCT Pub. Date: Feb. 12, 1998

(30) Foreign Application Priority Data

Aug. 7, 1996 (DE) .......................................... 296 13 666 U

(51) Int. Cl.[7] .................................................. F16C 29/06
(52) U.S. Cl. ................................ 384/45; 384/55; 384/57; 384/59
(58) Field of Search ................................ 384/43, 44, 45, 384/55, 57, 59

(56) References Cited

U.S. PATENT DOCUMENTS

| Re. 35,126 | * 12/1995 | Agari | 384/45 |
|---|---|---|---|
| 3,650,166 | 3/1972 | Schmid | 82/32 |
| 4,775,247 | * 10/1988 | Isert | 384/43 |
| 5,308,167 | 5/1994 | Tsukada | 384/45 |
| 5,413,031 | 5/1995 | Kohlmeyer | 92/165 R |
| 5,501,528 | * 3/1996 | Agari et al. | 384/45 |
| 5,845,996 | * 12/1998 | Greubel et al. | 384/45 |
| 6,158,891 | * 12/2000 | Faulhaber et al. | 384/45 |

FOREIGN PATENT DOCUMENTS

| 706518 | 5/1941 | (DE) . |
|---|---|---|
| 1247077 | 8/1967 | (DE) . |
| 2145524 | 3/1973 | (DE) . |
| 3132869 | 3/1983 | (DE) . |
| 4317049 | 11/1994 | (DE) . |
| 4431286 | 4/1995 | (DE) . |
| 3843828 | 8/1996 | (DE) . |

OTHER PUBLICATIONS

Hoffmann Brochure, "Werkzeuge", Aug. 1981, 5 pages. No date.

* cited by examiner

*Primary Examiner*—Thomas R. Hannon
(74) *Attorney, Agent, or Firm*—Pandiscio & Pandiscio

(57) ABSTRACT

A guiding frame, with a carrier (10) provided with a fastening groove (11) and carrying at least one guiding rail (12) disposed parallel to said carrier and secured in a fastening groove (11), and on which rests a guiding bearing (13) that guides a sliding part (22).

Figure 1:
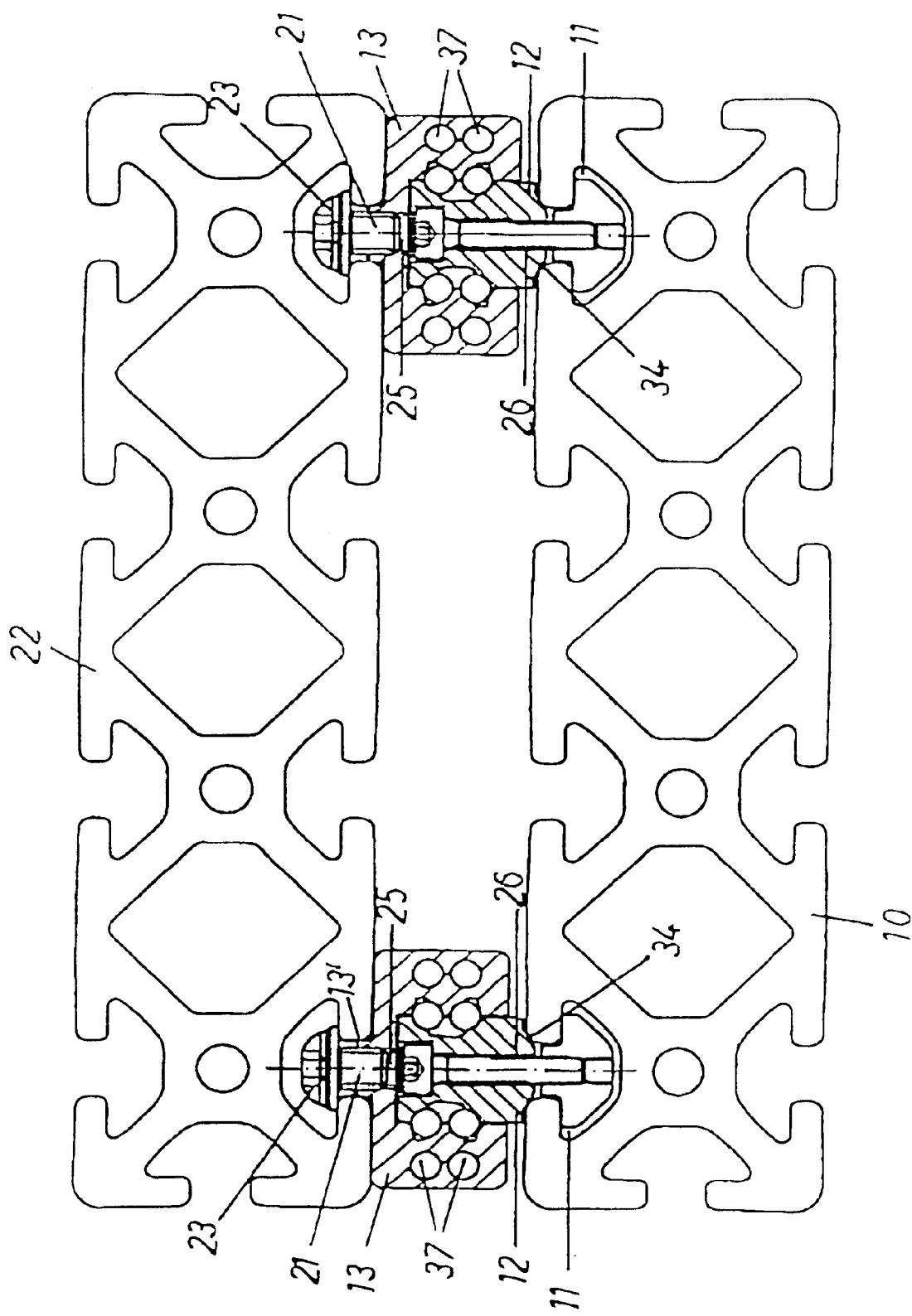

The guiding frame is implemented so that the substantially rectangular guiding rail (12) is supported via a rounded portion on the supporting edges that delimit the fastening groove (11) or on an intermediate bearing that bridges the fastening groove (11).

18 Claims, 5 Drawing Sheets

GUIDING FRAME

The invention relates to a guiding frame with a carrier provided with a fastening groove and carrying at least one substantially rectangular guiding rail disposed parallel to the carrier and secured in a fastening groove and on which rests a guiding bearing that guides a sliding part.

The carrier used in such guiding frames is comprised of a hollow shape of square or rectangular cross section, made, for example, of an aluminum alloy. The outer circumference of the carrier comprises undercut fastening grooves, so-called T-grooves. These fastening grooves can be used to fasten parts to the carrier to create machine frames, area installations or the like. It is generally known to fasten to a carrier a guiding rail on which a guiding bearing is able to move in the longitudinal direction of the rail and supports a part that is to be adjusted longitudinally, for example a slide plate, which, for example, must be precisely positioned for a machining task. Tilting, for example, of the slide plate would cause a workpiece or tool to be inaccurately positioned and the results of the machining done in that position to be inaccurate. It is also generally known to fasten to such carriers two mutually parallel guiding rails on which rest guiding bearings of longitudinally movable slides. A guiding bearing of the one guiding rail is rigidly connected to a guiding bearing of the other guiding rail by means of a slide plate or the like. The guiding bearings are roller bearings whose rollers run on the guiding rails. Such guiding frames are suitable for slides with small to medium-sized loads. However, they are less well suited for high-precision positioning tasks, for example for tool or workpiece carriages. Highly accurate positioning must be achieved if correspondingly accurate machining operations are to be performed on workpieces. For this purpose, it is generally known to use shaft-mounted spherical sleeves or guiding rails of round cross section. However, this requires that the hollow-section pieces or other fastening means into which the spherical sleeves are built have special profile sections.

Known from DE-A 31 32 869 is a guiding frame with a carrier that carries two substantially rectangular guiding rails disposed parallel to the carrier and attached thereto, and on which rests a guiding bearing that guides a sliding part. This bearing is a roller bearing with an external roller cage.

In contradistinction to the prior art, the task underlying the invention is to improve a guiding frame having the features cited in the preamble in such a way that it can be used for high-precision positioning tasks even of heavy loads, in particular tool and/or workpiece carriages.

This task is accomplished by the fact that the substantially rectangular guiding rail is supported via a rounded portion on the supporting edges of the carrier that delimit the undercut fastening groove or on an intermediate bearing that bridges the undercut fastening groove.

It is of importance for the invention, first, that the guiding frame is equipped with a substantially rectangular guiding rail. This can be attached to the top outer wall of the carrier in a conventional manner. The attachment is made, for example, by screwing with the aid of the undercut fastening grooves. However, rectangular guiding rails have the considerable disadvantage of sensitivity to torsion. Especially when two or more mutually parallel guiding rails are present, guiding rails that have become twisted during manufacture or on attachment to the carrier will attempt to impart a corresponding twist to the slide or its guiding bearing during the travel thereof. Depending on the degree of twist of the guiding rails, jamming can occur that prevents the movement of the slide. Jamming that affects system tolerances can also result. All parts of the system are subject to tolerances. This applies in particular to the carrier and/or any parts of the slide, especially if they are made of hollow extruded sections. The carrier and the hollow-section sliding parts are often configured with a slight concavity of the surfaces between their edges, for example in order to improve the desired firm seat of the front end of a hollow section against such a concave surface abutted by said front end. Such concavities are extremely small, but can still cause angular deviations of the sliding parts and/or the guiding bearings, resulting in jamming. The mounting of the carrier inside the guiding frame can also cause twist and/or angular deviations, which entail a corresponding risk of jamming. The risk of jamming is especially great when the guiding frame has to be manufactured to very close tolerances in order to achieve the desired positioning accuracy.

It can be advantageous to configure the guiding frame so that two or more mutually parallel guiding rails are present, each of which comprises a guiding bearing, and which are rigidly connected to one other, and at least one of which is attached via a rounded portion to least one carrier. It is of further considerable importance for the invention that at least one guiding rail is supported via a rounded portion. The rounded portion makes it possible to correct the seat of the guiding rail on the carrier. This correction is made by means of the slide during the mounting of the guiding rail on the carrier, in such a way that the slide can be moved on the guiding frame with permissible resistance to movement.

A very simple embodiment of the guiding rail is created if said guiding rail can be supported by its areas comprising rounded portions on the supporting edges forming the fastening groove. All that is needed in this case is to configure the guiding rail with a rounded portion, a production task of limited complexity. The guiding rail can be supported on the carrier not only directly but indirectly, via an intermediate bearing. This intermediate bearing bridges the fastening groove, thus resting on the planar outer surface of the carrier. On its side proximate the guiding rail it is implemented so as to be rounded and permits the required torsion-sensitive mounting of the guiding rail.

The guiding frame can be configured so that the guiding rail comprises a circular rounded portion in the region of the supporting edges. The positionability of the guiding rail on the carrier is then ideal and is independent of the torsion angle. Production is also simplified.

To reduce the surface pressure between the carrier and the guiding rail, the guiding frame can be realized so that the radii of the supporting edges are increased in comparison to other edge radii of the carrier.

The surface pressure between the supporting edges of the carrier and the guiding rail is reduced to an especially large extent if the supporting edges are implemented as concave. In both of the foregoing cases the cost and work of production are slight, since both the increase in the edge radii and the concave implementation of the supporting edges can be effected simultaneously with the manufacture of the carrier by extrusion, if carriers made of extruded aluminum alloy, for example, are used.

The guiding frame can be improved in that the guiding rail rests on a circularly cylindrical rounded portion in a corresponding circularly cylindrical rounded recess in the intermediate bearing. The guiding rail is accordingly of one piece and can be hingedly supported in the correspondingly rounded recess in the intermediate bearing. Comparatively great relative torsion can occur between the guiding rail and the intermediate bearing or the carrier. The supporting surfaces between the guiding rail and the intermediate bearing that come into play during such torsion are large and the specific surface pressures are therefore low. Depending on stability requirements, the intermediate bearing can be configured with a correspondingly large area, including on its side proximate the carrier.

If it is necessary to avoid a rounded configuration for the side of the guiding rail proximate the carrier, the guiding frame can be implemented so that the guiding rail is planar on the side proximate the carrier and is supported on the intermediate bearing via a rounded surface of a separate supporting bar. Conventional rectangular guiding rails can then be used. The torsion compensation takes place between the separate supporting bar and the intermediate bearing, provided that the supporting bar and the guiding rail are coupled in a relatively immovable manner.

The intermediate bearing advantageously comprises a projection to engage the groove so that the bearing is disposed relatively immovably on the carrier, in particular during adjustment of the torsion of the guiding rail.

The above-described embodiments of the guiding frame are of particular significance when the guiding bearing is realized as a straight-line guiding bearing. Straight-line guiding bearings are especially sensitive to torsion of the guiding rail, since they extend longitudinally over a substantial lengthwise segment and are themselves of low tolerance to torsion. Thus, by combining straight-line guiding bearings and guiding frames of the above-described embodiments with, in particular, rectangular guiding rails, it is possible to use the straight-line bearings to full advantage.

It is further advantageous to implement the guiding frame so that the guiding bearings are fastened to the rigidly connected sliding parts by means of fastening screws and the heads of these fastening screws engage grooves in the sliding parts. The guiding bearings can thus be fastened to their assigned sliding parts by simple means. There is essentially no need to use a special transition piece—e.g. a rigid plate—to connect them to the sliding parts.

With this arrangement, it is particularly advantageous to implement the guiding frame so that the guiding bearings comprise threaded bores that receive the fastening screws and are disposed axially parallel to the fastening bores in the respective assigned guiding rail. The fastening of the guiding bearings and the provision of the threaded bore in a guiding bearing therefore take place in an area that is not needed for the provision of bearing bodies of the bearing, for example for the provision of balls or rollers.

In a special manner, the guiding frame can be realized so that the guiding rail is provided with bearing surfaces disposed on both sides of its rounded portion and extending parallel to the supporting surfaces. These bearing surfaces extending parallel to the supporting surfaces make it possible to use the guiding rail even in cases where its rounded portion is not needed. In such cases, the surface of the carrier need only be recessed sufficiently to accommodate the rounded portion, while the bearing surfaces extending parallel to the supporting surfaces rest on the outer wall of the carrier. If the recess for the rounded portion of the guiding rail is sufficiently wide, the guiding rail can be displaced perpendicularly to its longitudinal axis, which is advantageous for the adjustment of two parallel guiding rails if the rounded portion of one of the guiding rails is sufficient to solve the torsion problem.

Figure 2:
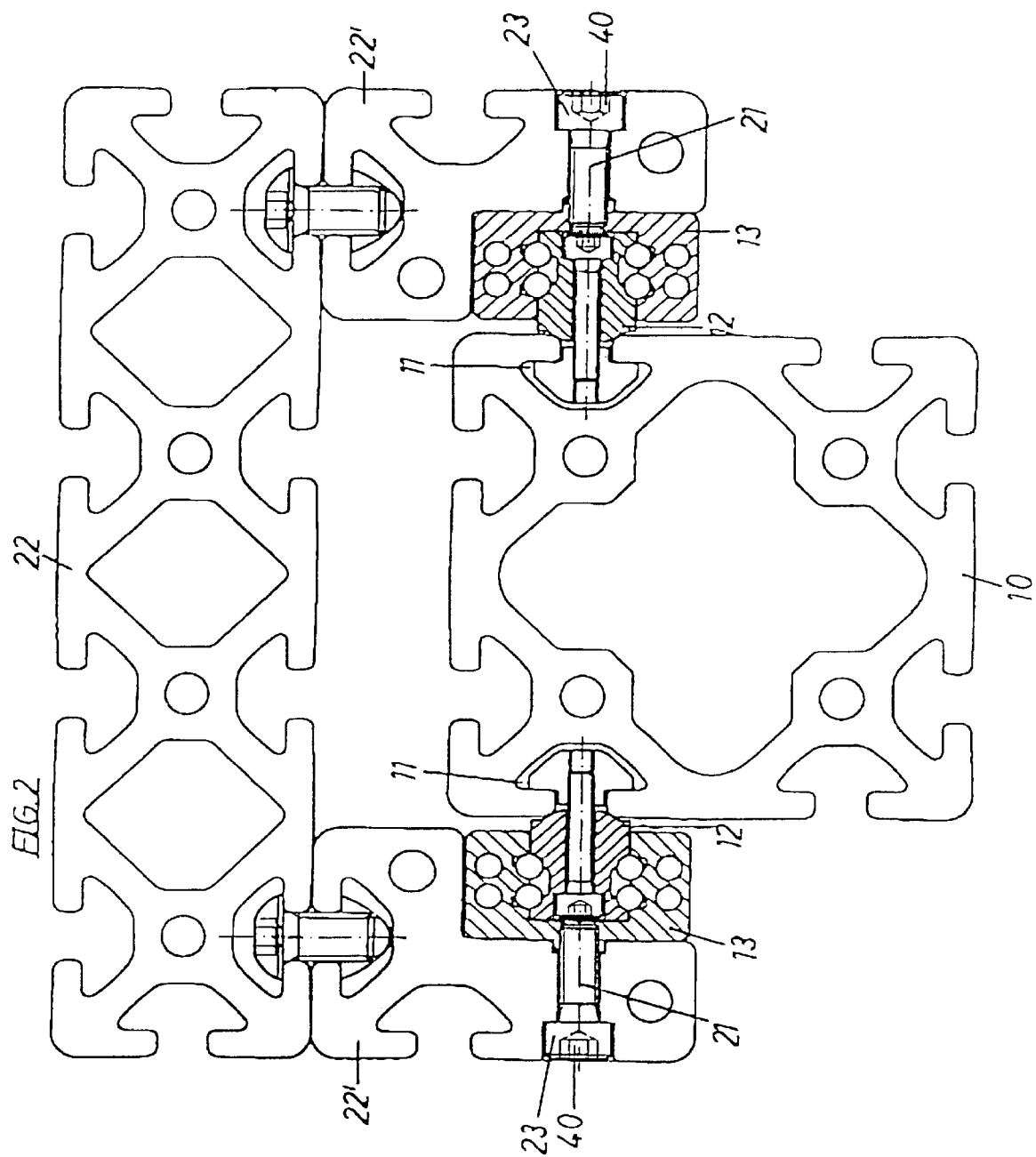
Figure 3:
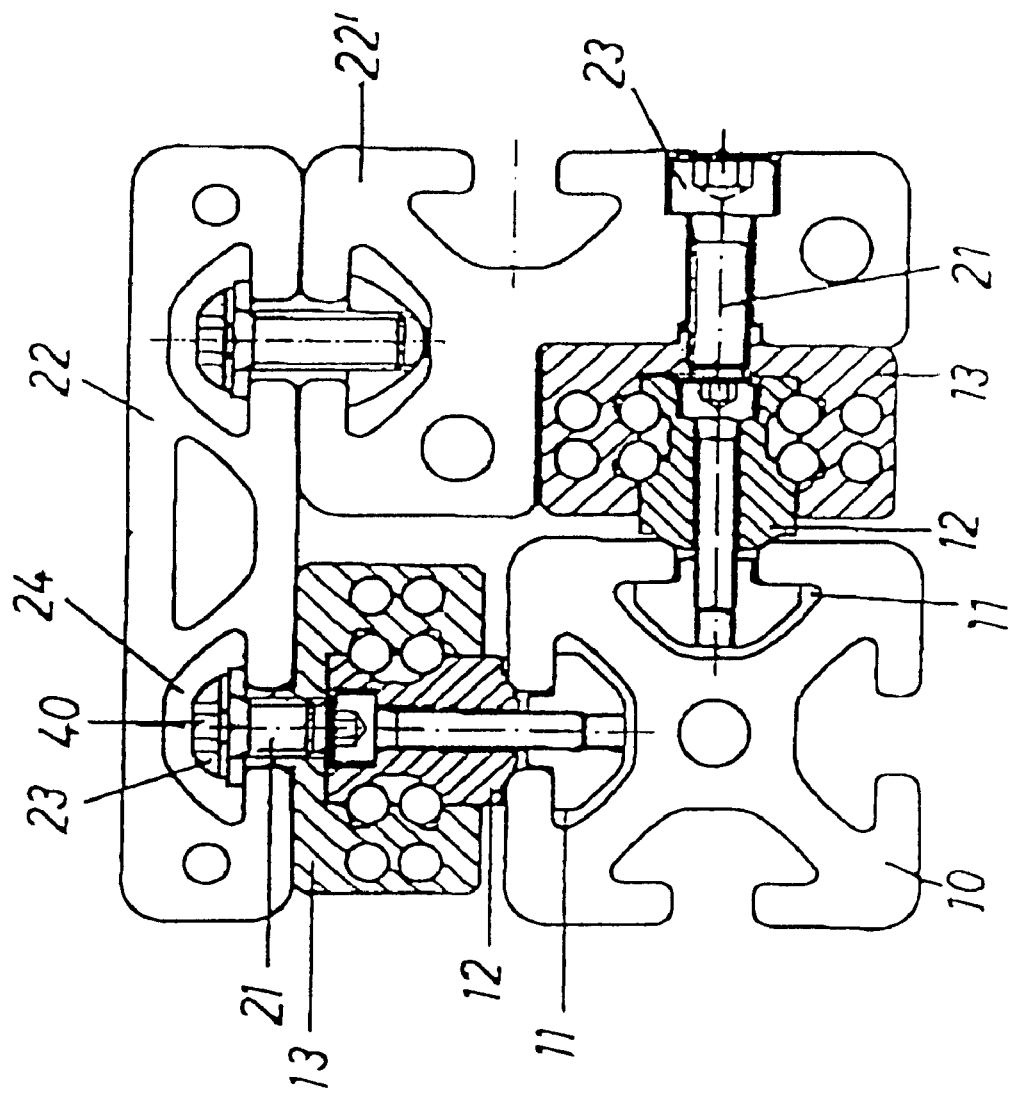
Figure 4:
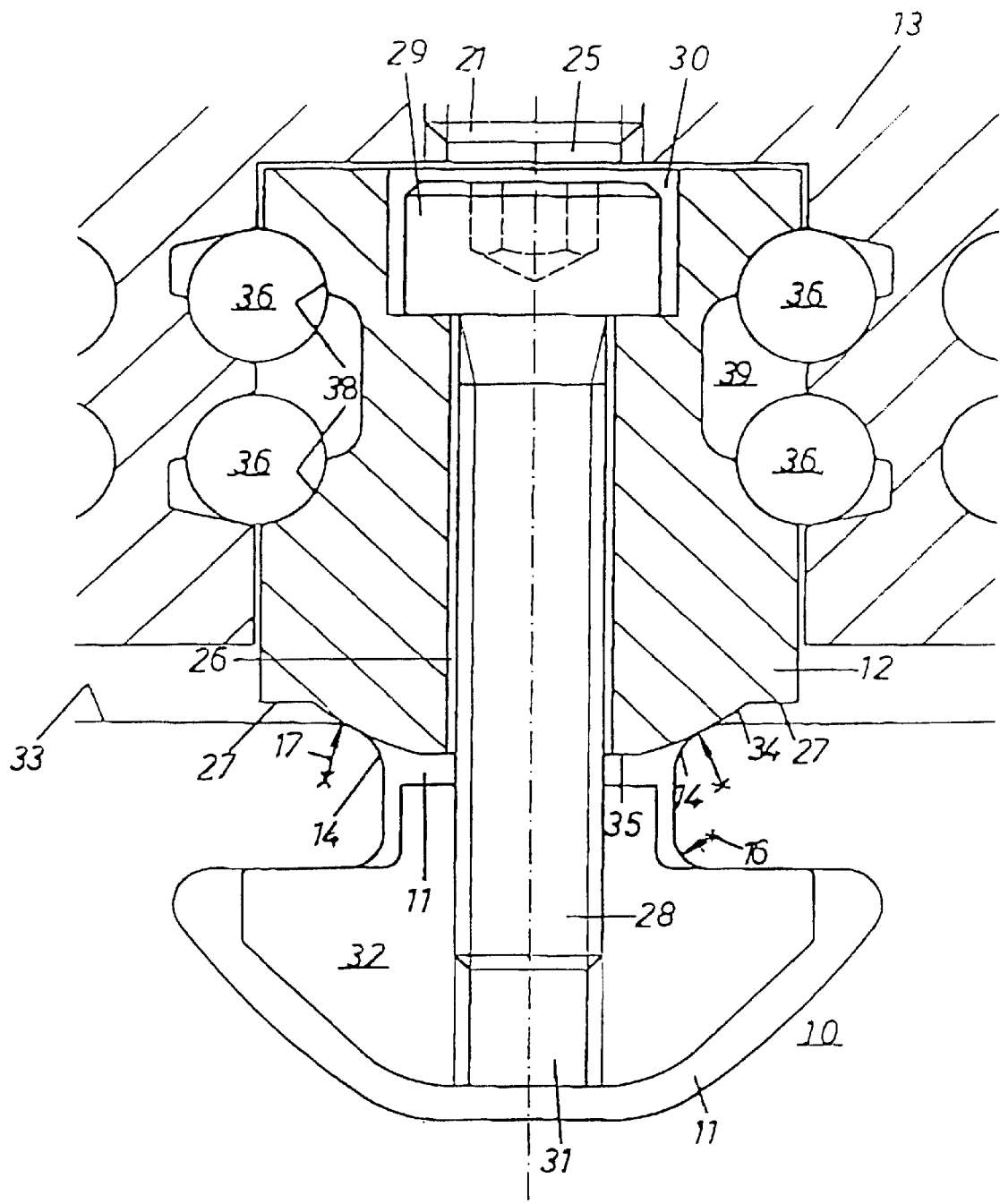
Figure 6:
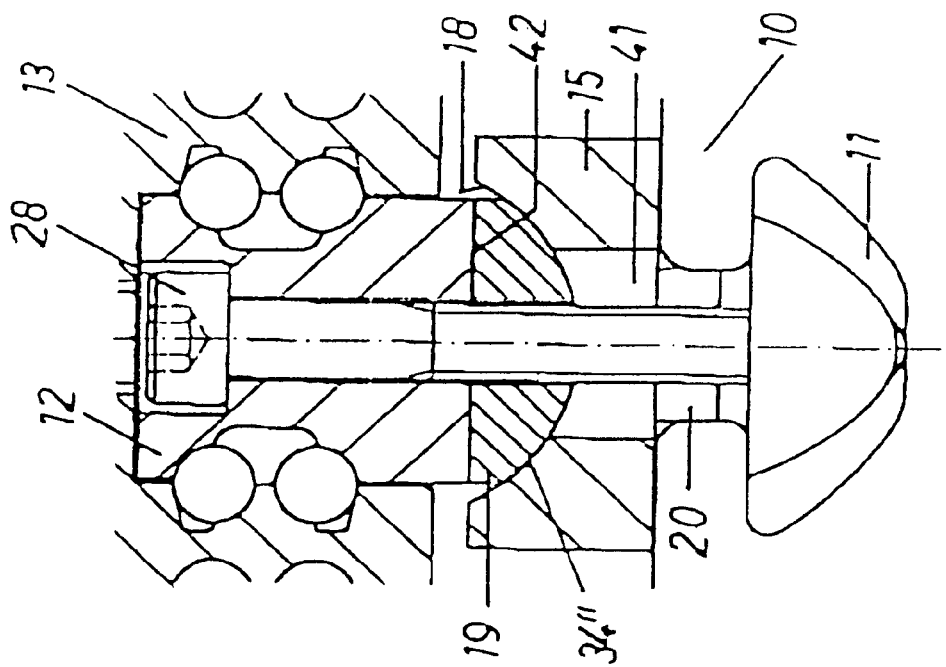
Figure 5:
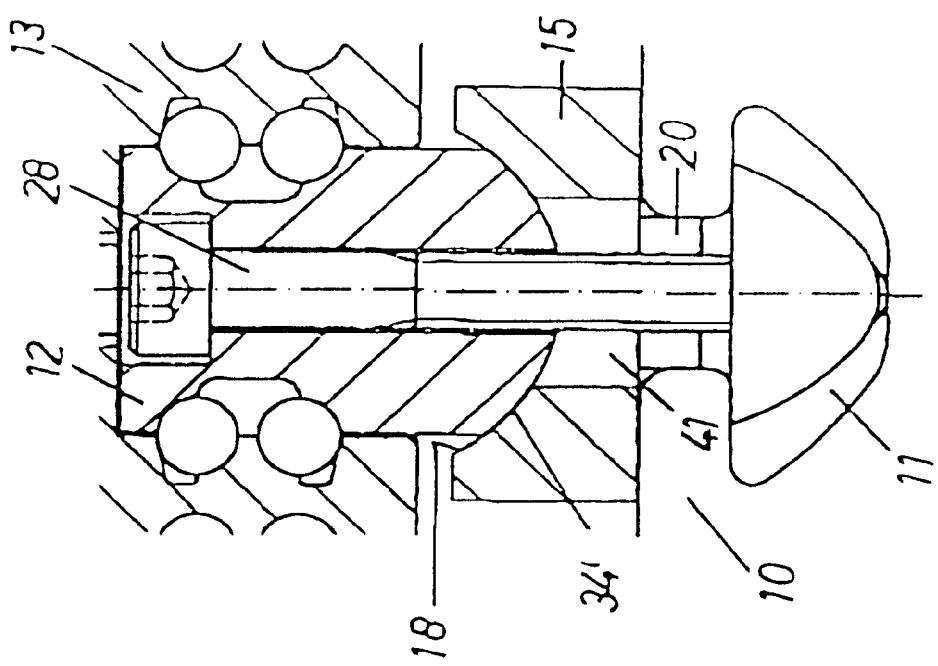

The invention is explained in more detail with reference to the exemplary embodiments depicted in the drawing, wherein:

FIG. 1 is a guiding frame in which two mutually parallel guiding rails are used for the longitudinal guidance of a laminar sliding part, FIG. 2 is a guiding frame for a laminar sliding part guided by means of guiding rails on two mutually parallel surfaces of a carrier, FIG. 3 is a guiding frame with angularly disposed sliding parts guided on two guiding rails fastened to surfaces of a carrier that are disposed at an angle to each other, FIG. 4 is an enlarged cross-sectional view of a guiding rail and the surrounding regions of a guiding bearing and a carrier, FIGS. 5 and 6 are a guiding rail according to FIG. 4, but supported on the carrier via an intermediate bearing.

The guiding frame depicted in FIGS. 1 to 3 is essentially comprised of a carrier 10, which is held up by legs, for example (not shown), or is otherwise integrated as in a machine frame. Each carrier is provided, in a manner known per se, with undercut fastening grooves 11, the number of which depends on the cross-sectional shape of the carrier 10 and which are evenly distributed about the circumference thereof.

Fastened to each carrier 10 are two mutually parallel guiding rails 12. The fastening is done according to FIG. 4 by means of fastening screws 28. A fastening screw 28 penetrates a fastening bore 26 in the guiding rail 12. The head 29 of fastening screw 28 is disposed in a head bore in guiding rail 12 and the shank of fastening screw 28 engages a threaded bore 31 in a tenon block 32 inserted in fastening groove 11 of carrier 10. When fastening screw 28 is tightened, guiding rail 12 is pulled against carrier 10, i.e., against the outer wall 33 thereof proximate the rail, and in particular, against the supporting edges 14 that form fastening groove 11.

Supporting edges 14 are rounded. As depicted in FIG. 4, their edge radius 17 is increased relative to edge radius 16 proximate tenon block 32. The surface pressure is therefore reduced.

Guiding rail 12 is substantially rectangular. It comprises a rounded portion on its side proximate the carrier. Its rounded portion 34 is circularly cylindrical and comprises a flattening 35 in the region of fastening bore 26. A bearing surface 27 is disposed on each side of rounded portion 34. The two bearing surfaces 27 are coplanar and are able to rest (in a manner not shown) on the outer surface 33 of carrier 10, if groove 14 is of suitable width or if carrier 10 is suitably recessed in the region of edge radii 17 so that the rounded portion 34 can be immersed in this recess and the bearing surfaces 27 abut outer wall 33. In this special case, the effect of the rounded portion 34 is eliminated. However, if the recessing of supporting edges 14 is sufficiently great, guiding rail 12 can now be displaced horizontally, enabling guiding rail 12 to be adjusted without torsion in this plane. It is also possible to use a V-shaped bottom portion, for example, between the guiding rail and the carrier.

In all the exemplary embodiments, the guiding rail 12 is substantially rectangular in cross section. Each guiding rail 12 carries one or more guiding bearings 13, which are realized as straight-line bearings. In particular, they are ball bearings. The balls 36 travel in ball races 37, which are also filled with balls (not shown). Such ball bearings are highly precise and suitable for high loads. They permit high positioning accuracy. The balls 36 are supported on guideways 38 in guiding rail 12. The guideways 38 extend in the longitudinal direction of guiding rail 12, as does the longitudinal recess 39 therein, which affords space for the balls 36 outside the raceways 38 but inside the guiding rail 12.

The guiding bearings 13 are assembled with sliding parts 22. For this purpose, according to FIG. 4 the guiding bearings comprise a threaded bore 25 able to receive a fastening screw 21. Such a fastening screw 21 secures a guiding bearing on a sliding part 22 by engaging with its head 23 a groove 24 in a sliding part 22. This engagement can be variously implemented. The head of the fastening screw 21 can engage an undercut groove 24, as depicted in FIG. 1 and at the top of FIG. 3. However, the head 23 of a fastening screw 21 can also be disposed in any desired groove 24 in a sliding part, as depicted in FIG. 2 and on the right in FIG. 3. In the first case the screwhead 23 is concealed and an access bore (not shown) must be provided for manipulating it, for example by means of a multi-sided internal recess 40 (see FIG. 3). Such a special access bore is not necessary for the heads 23 of the screws in FIG. 2, since their multi-sided internal recesses 40 are freely accessible. However, the special provision of an access bore for fastening screw 21 must be possible.

The sliding parts 22 are configured as dictated by the requirements in each case. FIG. 1 shows as the sliding part 22 a plate whose shape conforms to that of the carrier 10. FIG. 2 also depicts such a sliding part 22. The carrier parts 10 of FIGS. 1, 2 and 3 are implemented differently, however. The carrier part 10 of FIG. 1 has two mutually parallel guiding rails 12 on only one plate wall, and the sliding part 22 is therefore supported vertically to the plane of projection by means of two guiding bearings 13 on each guiding rail 12. Each guiding rail 12 rests via its rounded portion 34 on the carrier or on the edges 14 of the groove therein. The angular position of the guiding rails 12 in the plane of projection of FIG. 1 must in each case be adjusted over the length of the carrier 10 by means of the rounded portion 34. This is done by checking the ease of action of the slide or the sliding part 22 by segments during assembly. If such ease of action is not present to the required extent, the fastening screw 28 of at least one guiding rail 12 must be loosened and the guiding rail 12 rotated so that said ease of action is attained. If this is not possible even by the adjustment of both guiding rails 12, it will be necessary, for example, to perform the torsionless horizontal displacement of a guiding rail 12 as described hereinabove but not shown.

In FIG. 1, sliding part 22 is loaded perpendicularly to the plane of the ball race. In this direction, the loading capacity of guiding bearing 13 is slightly lower than it is radially, i.e., in the plane of the ball race. For higher loads, the bearings of the sliding part 22 are therefore arranged as shown in FIG. 2. Here, a substantially square carrier 10 is provided, to each of whose mutually parallel outer walls is fastened a guiding rail 12, as described previously. The guiding bearings 36 thus are loaded radially, i.e., in the plane of their ball races. This requires an angular sliding part 22', which is screwed together with the laminar sliding part 22 as shown.

FIG. 3 depicts a carrier 10 also of square but of smaller cross section and comprising two diagonally arranged guiding rails 12. Two outer walls of the carrier 10 disposed at angles to each other therefore each carry a guiding rail 12, each of which has two guiding bearings 13 aligned perpendicularly to the plane of projection. The guiding bearings 13 are connected on the one hand to a sliding part 22 and on the other hand to a sliding part 22' disposed at an angle to sliding part, 22, a screw connection being provided between the two sliding parts 22, 22'. Such an embodiment is suitable for high-precision positioning tasks requiring moderate loading capacity.

In all cases it is provided that the guiding bearings 33 engage a guide bar 13' in a groove in the sliding part 22 or 22' (see FIG. 1, left). This engagement serves to ensure proper positioning during the assembly of the guiding rail 13 with the sliding part 22 or 22'. In the exemplary embodiments of the guiding rail 12 described hereinabove, the guiding rail was supported by its rounded portion 34 directly on the carrier. As shown in FIGS. 5 and 6, the guiding rail can also be implemented so that it can be supported indirectly on the carrier 10 by means of a special rounded portion 34' or 34". Such indirect support is effected by means of an intermediate bearing 15, which bridges fastening groove 11 and thus, on its side proximate the carrier, is able to rest on the outer wall of the carrier 10 over a large area. This prevents any edge pressure in the area of the edges 14 of fastening groove 11. Each intermediate bearing 15 is provided with a wide access bore 41 for fastening screw 28 of guide bar 12. Intermediate bearing 15 has a rounded recess 18 that is configured as circularly cylindrical. This is a groove-like recess that extends perpendicularly to the plane of projection over the entire length of intermediate bearing 15, so that guiding rail 12 can be supported over a correspondingly large area. High surface pressures are thereby avoided. For the positioning of intermediate bearing 15 relative to carrier 10, intermediate bearing 15 has a groove-engaging projection 20, which for positioning reasons is advantageously as long as intermediate bearing 15 itself.

Whereas the intermediate bearings 15 of FIGS. 5 and 6 can be implemented in the same manner, their assigned guiding rails 12 are implemented differently. According to FIG. 5, guiding rail 12 comprises on its side proximate the carrier, i.e., its side proximate intermediate bearing, a circularly cylindrical rounded portion 34' that conforms to rounded recess 18. According to FIG. 6, however, guiding rail 12 is of conventional cross-sectional shape, i.e., is provided on its side proximate the carrier with a planar surface 42 by which guiding rail 12 rests on a correspondingly planar surface of a separate supporting bar 19. Said supporting bar 19 is implemented as rounded on its side proximate carrier and rests on intermediate bearing 15 i.e., on the rounded recess 18 therein. The relative position between guiding rail 12 and supporting bar 19 must be secured, which can be done, for example, by suitably implementing fastening screw 28 as a dowel screw. It is also possible to have a form-fitting connection of supporting bar 19 to guiding rail 12 in the region of their bearing surface 42.

What is claimed is:

1. A guiding frame including a carrier (10) having at least one fastening groove (11) formed therein, at least one substantially rectangular guiding rail (12) disposed parallel to said carrier and secured in a selected one of said at least one fastening groove (11), and a guiding bearing (13) resting on each of said at least one guiding rail (12) for guiding a sliding part (22), characterized in that each of said at least one fastening groove is undercut, and in that each of said at least one substantially rectangular guiding rail (12) rests on supporting edges (14) that delimit the open side of the undercut fastening groove (11) in which it is secured.

2. A guiding frame according to claim 1, characterized in that at least two mutually parallel guiding rails (12) are present, each said guiding rail being rigidly connected to a guiding bearing (13), and in that at least one of said guiding rails (12) comprises a rounded portion (34 to 34") attached to a carrier.

3. A guiding frame according to claim 1, characterized in that the guiding rail (12) is rounded in the region whereat it rests on the supporting edges (14).

4. A guiding frame according to claim 3, characterized in that the edge radii (17) of the supporting edges (14) are greater than the adjacent radii (16) of the undercut portion of the fastening groove (11).

5. A guiding frame according to claim 3, characterized in that the guiding rail (12) is provided on both sides of its rounded portion with bearing surfaces (27) disposed parallel to said supporting edges (14).

6. A guiding frame according to claim 1, characterized in that the supporting edges (14) are concave in transverse cross-section.

7. A guiding frame according to claim 1, characterized in that the guiding bearings (13) are straight-line bearings.

8. A guiding frame according to claim 1, characterized in that the guiding bearings (13) are fastened by screws (21) to the sliding part (22), and in that the heads (23) of screws (21) engage a groove (24) in the sliding part (22).

9. A guiding frame according to claim 1, characterized in that the guiding bearings (13) comprise threaded bores (25) adapted to receive screws (21), said threaded bores being disposed axially parallel to fastening bores (26) located in the guiding rail associated therewith.

10. A guiding frame including a carrier (10) having at least one fastening groove (11) formed therein, at least one substantially rectangular guiding rail (12) disposed parallel to said carrier and secured in a selected one of said at least one fastening groove (11), and a guiding bearing (13) resting on each of said at least one guiding rail (12) for guiding a sliding part (22), characterized in that each of said at least one fastening groove (11) is undercut, and in that each of said at least one guiding rail (12) rests on an intermediate bearing (15) that bridges the open side of an associated one of said at least one fastening groove (11).

11. A guiding frame according to claim 10, characterized in that at least two mutually parallel guiding rails (12) are present, each said guiding rail being rigidly attached to a guiding bearing (13), and in that at least one of said guiding rails (12) comprises a rounded portion (34 to 34") attached to a carrier.

12. A guiding frame according to claim 10, characterized in that the guiding rail (12) comprises a cylindrically rounded portion, that the intermediate bearing (15) comprises cylindrically rounded recess (18), and that said cylindrically rounded portion of said guide rail (12) is adapted to rest in said cylindrically rounded recess in said intermediate bearing (15).

13. A guiding frame according to claim 12, characterized in that the guiding rail (12) is provided on both sides of its rounded portion with bearing surfaces (27) disposed parallel to said supporting edges (14).

14. A guiding frame according to claim 10, characterized in that the guiding rail (12) comprises a substantially planar bearing surface, in that said guiding frame further comprises a supporting bar having a rounded surface, and in that said supporting bar is adapted to be supported on said intermediate bearing (15) and said planar bearing surface of said guide rail (12) is adapted to be supported by said supporting bar.

15. A guiding frame according to claim 10, characterized in that the intermediate bearing (15) comprises a fastening groove engaging projection (20).

16. A guiding frame according to claim 10, characterized in that the guiding bearings (13) are straight-line bearings.

17. A guiding frame according to claim 10, characterized in that the guiding bearings (13) are fastened by screws (21) to the sliding part (22), and that the heads (23) of screws (21) each engage a groove (24) in the sliding part (22).

18. A guiding frame according to claim 10, characterized in that the guiding bearings (13) comprise threaded bores (25) adapted to receive screws (21), said threaded bores being disposed axially parallel to the fastening bores (26) located in the guiding rail associated therewith.

* * * * *